United States Patent
Imai et al.

(10) Patent No.: US 8,310,496 B2
(45) Date of Patent: Nov. 13, 2012

(54) IMAGE DISPLAY DEVICE AND IMAGE DISPLAY METHOD

(75) Inventors: Yoshie Imai, Kawasaki (JP); Goh Itoh, Tokyo (JP); Masahiro Baba, Yokohama (JP); Yasutoyo Takeyama, Yokohama (JP); Hisashi Kobiki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 828 days.

(21) Appl. No.: 12/428,525

(22) Filed: Apr. 23, 2009

(65) Prior Publication Data

US 2009/0268960 A1 Oct. 29, 2009

(30) Foreign Application Priority Data

Apr. 28, 2008 (JP) ................. 2008-117191

(51) Int. Cl.
G09G 5/00 (2006.01)
(52) U.S. Cl. ............. 345/581; 345/593; 725/39
(58) Field of Classification Search .......... 345/204, 345/207, 581, 593; 725/39, 52, 56; 348/113, 348/114, 141, 739
See application file for complete search history.

(56) References Cited

U.S. PATENT DOCUMENTS 7,697,939 B2 * 4/2010 Wada et al. ............ 455/452.2

FOREIGN PATENT DOCUMENTS

| JP | 10-108086 | 4/1998 |
|---|---|---|
| JP | 2000-49984 | 2/2000 |
| JP | 2004-228788 | 8/2004 |
| JP | 2005-094072 | 4/2005 |
| JP | 2005-347788 | 12/2005 |
| JP | 2006-237773 | 9/2006 |
| JP | 2008-28871 | 2/2008 |

OTHER PUBLICATIONS

Japanese Office Action for Japanese Patent Application No. 2008-117191 issued on Aug. 7, 2012.

* cited by examiner

Primary Examiner — Abbas Abdulselam
(74) Attorney, Agent, or Firm — Turocy & Watson, LLP

(57) ABSTRACT

An image display device includes: an image input unit configured to input an image; a content categorizer configured to determine a content category of the image; a database configured to store adjustment items corresponding to each of a plurality of content categories, the adjustment items being related to sensibility words each representing an impression for images; an adjustment item display configured to display the adjustment items corresponding to the content category, the adjustment item being selectable by a user; a receiver configured to receive set values of the adjustment items selected from the user; an image quality parameter calculator configured to calculate image quality parameters in accordance with the set values of the adjustment items; an image processor configured to perform image processing on the image in accordance with the image quality parameters; and an image display configured to display the processed image.

11 Claims, 10 Drawing Sheets

| | IMAGE QUALITY PARAMETERS 3-1 | | | | |
|---|---|---|---|---|---|
| | VALUE | CHROMA | HUE | CONTRAST | GRAININESS |
| WARM | | | | | |
| COLD | | | | | |
| FRIGHTENING | | | | | |
| ENJOYABLE | | | | | |

FIG. 2

| INITIAL VALUES | CONTENT CATEGORIES ||| 3-2 |
| --- | --- | --- | --- | --- |
|  | LOVE DRAMAS | HORROR MOVIES | SOCCER | |
| WARM – COLD |  |  |  | |
| FRIGHTENING – ENJOYABLE |  |  |  | |

FIG. 3

| SET VALUES | CONTENT CATEGORIES | | |
|---|---|---|---|
| | LOVE DRAMAS | HORROR MOVIES | SOCCER |
| WARM – COLD | | | |
| FRIGHTENING – ENJOYABLE | | | |

| PRIORITY (POINTS) | CONTENT CATEGORIES ||||
| --- | --- | --- | --- | --- |
| | LOVE DRAMAS | HORROR MOVIES | SOCCER | |
| WARM – COLD | | | | |
| FRIGHTENING – ENJOYABLE | | | | |

| RECOMMENDED RANGES | CONTENT CATEGORIES ||| 3-5 |
| --- | --- | --- | --- | --- |
| | LOVE DRAMAS | HORROR MOVIES | SOCCER | |
| WARM – COLD | | | | |
| FRIGHTENING – ENJOYABLE | | | | |

FIG. 9

IMAGE DISPLAY DEVICE AND IMAGE DISPLAY METHOD

CROSS REFERENCE TO RELATED APPLICATIONS

This application is based upon and claims the benefit of priority from the prior Japanese Patent Application No. 2008-117191, filed on Apr. 28, 2008, the entire contents of which are incorporated herein by reference.

BACKGROUND OF THE INVENTION

1. Field of the Invention

The present invention relates to an image display device and an image display method capable of providing a suitable image quality corresponding to content.

2. Related Art

In an image display device such as a television, a viewer (or watcher) can adjust image quality in accordance with his liking. Generally, the viewer adjusts the image quality by converting the modes which are previously prepared by a manufacturer as preset functions, or by changing the set values of adjustment items such as contrast and three attributes of color space, namely brightness, color tone, and vividness.

In recent years, with the increase of content and information, various content has been broadcasted through the television. With the diversification of lifestyles, audio-visual environment of the content has also been varied. Further, the development of the image display device has made it possible to view one-segment broadcasting with a cellular phone, and to display images as a slide show by inserting a memory card storing still images shot by a user into a "digital picture frame" or the like, which begins to become popular.

There is a suitable image quality corresponding to the content and audio-visual environment. However, the viewer does not frequently change the image quality since it is troublesome to adjust the image quality every time the content changes.

It is disclosed in JP-A 10-108086 (Kokai) that signal processing for improving the image quality is performed by automatically detecting a content genre and audio-visual environment to select the optimum mode for the detected environment from a plurality kinds of image processing modes.

JP-A 2005-94072 (Kokai) discloses a means to reflect the liking of the viewer, by which the viewer can set a mode by himself. The viewer relates a keyword to adjustment parameters for adjusting image quality or sound quality to store and register the relationship as a mode. When content information and the keyword accord with each other, the image quality or the sound quality is adjusted by using the registered adjustment parameters.

In a device disclosed in JP-A 10-108086 (Kokai), the liking of the viewer is not sufficiently reflected since the number of adjustment items settable by the viewer is small.

Further, it is difficult for a general viewer to sense how the image is actually changed by changing the set values of the adjustment items. Accordingly, in JP-A 2005-94072 (Kokai), the adjustment of the image quality is difficult for the viewers who do not know the item to be adjusted and the adjustment level to be achieved, in which most viewers do not adjust the adjustment items in the end. Therefore, it is not often that the liking of the viewer is actually reflected.

SUMMARY OF THE INVENTION

According to an aspect of the present invention, there is provided with an image display device. The image display device includes an image input unit, a content categorizer, a database, an adjustment item display, a receiver, an image quality parameter, an image processor and an image display. The image input unit inputs an image. The content categorizer determines a content category of the image to any one of a plurality of content categories given in advance. The database stores adjustment items corresponding to each of the content categories, the adjustment items being related to sensibility words each representing an impression for images. The adjustment item display displays the adjustment items corresponding to the content category, the adjustment item being selectable by a user. The receiver receives set values of the adjustment items selected from the user. The image quality parameter calculator calculates image quality parameters in accordance with the set values of the adjustment items. The image processor performs image processing on the image in accordance with the image quality parameters. The image display displays the processed image.

BRIEF DESCRIPTION OF THE DRAWINGS

FIG. 2 is a diagram showing an example of an image quality parameter table according to the first embodiment of the present invention.

FIG. 3 is a diagram showing an example of an initial value table according to the first embodiment of the present invention.

FIG. 4 is a diagram showing an example of a set value table according to the first embodiment of the present invention.

FIG. 5 is a diagram showing an example of a priority table according to the first embodiment of the present invention.

FIG. 9 is a diagram showing an example of a recommended range table according to a fifth embodiment of the present invention.

DETAILED DESCRIPTION OF THE INVENTION

Figure 1:
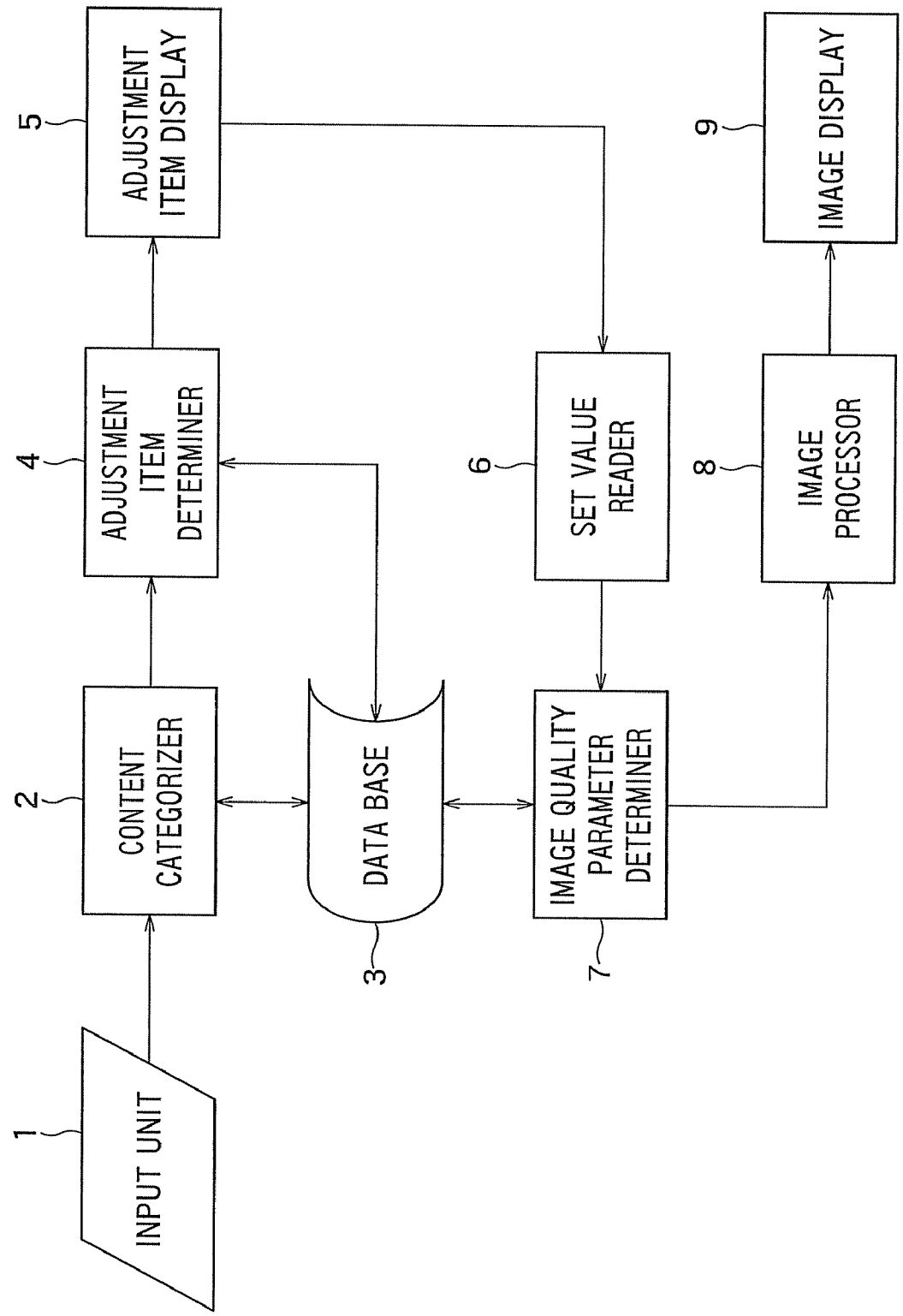
FIG. 1 is a block diagram showing an image display device according to a first embodiment of the present invention.

Hereinafter, the embodiments of the present invention will be explained referring to the drawings.

First Embodiment

An image display device according to a first embodiment of the present invention is provided to be incorporated into a television to receive broadcast signals or a cellular phone having a function to receive one-segment broadcasting.

FIG. 1 is a block diagram showing the image display device according to the first embodiment. The image display device includes: an input unit 1; a content categorizer 2; a database 3; an adjustment item determiner 4; an adjustment item display 5; a set value reader 6; an image quality parameter determiner 7; an image processor 8; and an image display 9.

An image is input into the input unit 1. When the image has a video signal of television broadcasting, the input unit 1 functions as a tuner and decodes the video signal.

The content categorizer 2 determines the content category of the image. The content category is determined based on at least one of program content information transmitted through teletext broadcasting, program information transmitted through data broadcasting, and EPG (Electronic Program Guide) data transmitted through digital broadcasting or the Internet. Such information is previously acquired through the input unit 1.

EPG has genre information and sub-genre information expressed by codes. When the sub-genre information exists, the code thereof is set as a content category. When there are a plurality pieces of genre information, it is possible to determine the category to which the content belongs by extracting keywords or judging context from program content information or program information. When there is only broad genre information such as dramas or sports, the category to which the content belongs is determined in a similar manner as when there are a plurality pieces of genre information.

The database 3 stores the relationship among the content category, the adjustment items and their values which are prepared corresponding to sensibility words for representing the impression of the image, and image quality parameters etc. More specifically, the database 3 has an image quality parameter table 3-1 in FIG. 2, an initial value table 3-2 in FIG. 3, a set value table 3-3 in FIG. 4, and a priority table 3-4 in FIG. 5.

There is a broad content category such as "dramas," "movies," "sports," etc., while there is a detailed content category such as "love dramas," "horror movies," "soccer," etc. Here, explanation will be made based on the detailed category.

Each adjustment item expresses the impression of the image with a sensibility word (word which expresses sensitivity and impression). A color gives an impression, which has been studied in color psychology through the ages. For example, it is said that a "warm color" such as red and orange gives a warm impression while a "cold color" such as blue and purple gives a cold impression. It is further said that a bright color having a low chroma gives a light impression. These senses vary from person to person, but are recognized to be substantially common to cultures and races. Further, a pair of adjective and its antonym or a pair of adjective verb and its antonym is often used to express such a sensibility word. The pair has various patterns such as: heavy and light; sober and showy; lively and calm; and rich and plain. One of the significant characteristics in the first embodiment is to use these sensibility words as the adjustment items.

In the image quality parameter table 3-1 in FIG. 2, the image quality parameters are set corresponding to the sensibility words. As stated above, a color gives an impression, which leads to a sensibility word. Therefore, signals and parameters showing the impression are set as image quality parameters. The image quality parameters are, for example, three attributes of color space, namely value (brightness), chroma (vividness), and hue (color tone). It is also possible to simply determine the color based on RGB values. Additionally, there are various image quality parameters such as contrast, graininess, etc. Thus, the parameters corresponding to the impression are entered.

In the initial value table 3-2 in FIG. 3, the initial values of the adjustment items are entered corresponding to each content category, while in the set value table 3-3 in FIG. 4, the present set values of the adjustment items are entered corresponding to each content category. For example, in the adjustment item "warm-cold," when "warm" level is set at 1 and "cold" level is set at 0, a value which is equal to or greater than 0 and is equal to or less than 1 is entered. Since there are sensitive or impressive adjectives suitable for each content category, a different value is set for each adjustment item as stated above. In the content category "love dramas," for example, the sense of "warm and cold" is conceivable and the sense of "frightening and enjoyable" is inconceivable for a general viewer (or watcher). Taking the correspondence between such a sense and the content category seriously, the initial values are previously set in the initial value table 3-2. Further, since every viewer has his own sense and liking, the viewer can change the initial values and set the changed initial values as the present set values in the set value table 3-3.

In the priority table 3-4 in FIG. 5, the priorities of the adjustment items is set corresponding to each content category. As stated above, there are a conceivable sense and an inconceivable sense corresponding to the content category. The conceivable sense makes it easy for the viewer to judge what is to his liking, while the inconceivable sense makes it difficult for the viewer to judge what is to his liking. Therefore, the priorities of the adjustment items corresponding to each content category is set so that the adjustment items on the conceivable senses are preferentially displayed.

The adjustment item determiner 4 refers to the database 3 (3-1 to 3-4) to determine the adjustment items which correspond to the content category determined by the content categorizer 2 and the priorities of the adjustment items.

The adjustment item display 5 displays the adjustment items determined by the adjustment item determiner 4 in accordance with the priorities. For example, a predetermined number of adjustment items from the top are displayed. Note that when the viewer has an item which is desired to be always displayed, the item can be always displayed regardless of the priority. It is also possible for the viewer to group the adjustment items which are not displayed as having low priority into "the other items" so that the viewer can individually select the adjustment items he wants to display from the group.

Figure 6:
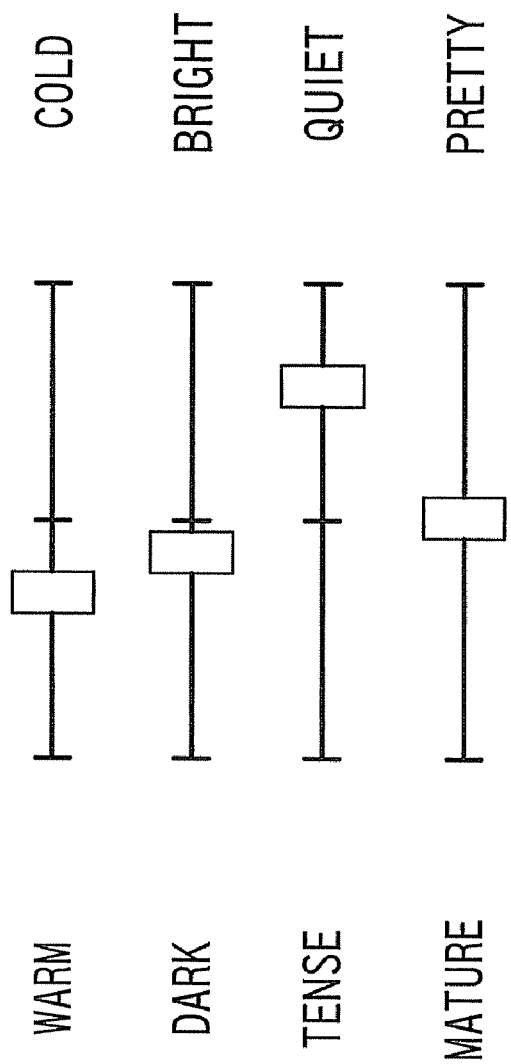
FIG. 6 is a diagram showing a display example of adjustment items according to the first embodiment of the present invention.

FIG. 6 shows a display example of the adjustment items. The value of each adjustment item is displayed in the relative position on an axis to represent a pair of words at its both ends. For example, the adjustment items have the initial values. Note that when the present set values are previously set, the present set values (previous history) can be displayed. The viewer sets the values (levels) of the displayed adjustment items through an input interface (not shown). The adjustment item display 5 includes a receiver to receive the value set (changed) from the viewer through the input interface (not shown).

Figure 7:
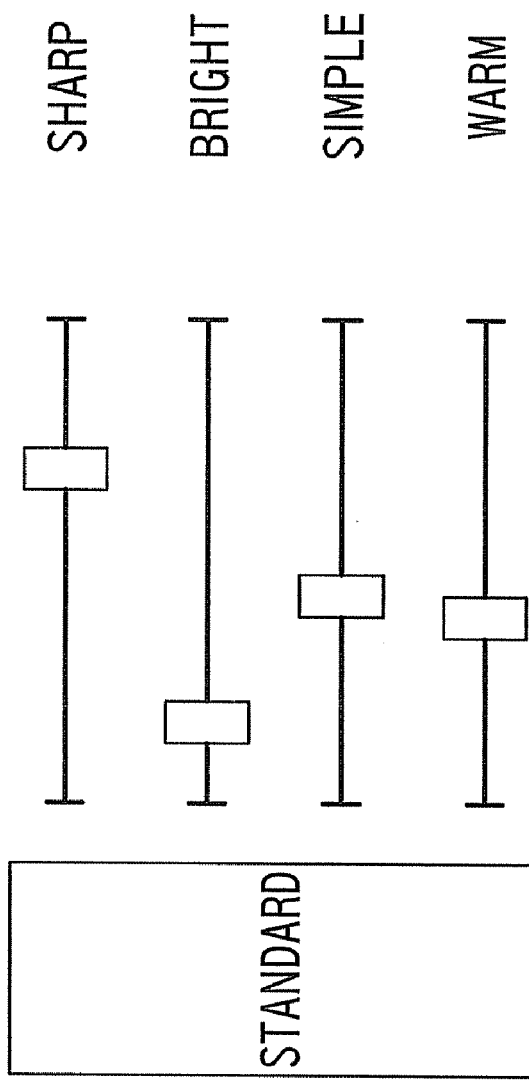
FIG. 7 is a diagram showing another display example of the adjustment items according to the first embodiment of the present invention.

FIG. 7 shows another display example of the adjustment items. In this example, the value of each adjustment item is expressed in the relative position to the standard value.

The set value reader 6 reads the values of the adjustment items set by the viewer to transmit the values to the image quality parameter determiner 7.

The image quality parameter determiner (image quality parameter calculator) 7 refers to the image quality parameter table 3-1 in FIG. 2 to determine the image quality parameters based on the values of the adjustment items received from the set value reader 6. Since there are generally a plurality of adjustment items, the image quality parameter determiner 7 calculates the relationship among those adjustment items to determine the set of image quality parameters.

As one example, suppose a case where two adjustment items "warm-cold" and "frightening-enjoyable" are displayed and the value for each adjustment item is set. When the adjustment item "warm-cold" is adjusted by selecting the third level of ten levels from the warmest level, the point to internally divide the axis in the ratio of 3 to 7 is selected within the change range of the image quality parameter in the adjustment item "warm-cold." Similarly, when the adjustment item "frightening-enjoyable" is adjusted by selecting the eighth level of ten levels from the most frightening level, the point to internally divide the axis in the ratio of 8 to 2 is selected within the change range of the image quality parameter in the adjustment item "frightening-enjoyable." After that, the parameters obtained in the adjustment items "warm-cold" and "frightening-enjoyable" are averaged to determine the set of image quality parameters.

As another example, suppose a case where two adjustment items "standard-sharp" and "standard-bright" are displayed (see FIG. 7) and the value for each adjustment item is set. When the adjustment item "standard-sharp" is adjusted by selecting the third level of ten levels from the sharpest level, the point to internally divide the axis in the ratio of 3 to 7 is selected within the change range of the image quality parameter in the adjustment item "sharp-standard." Similarly, when the adjustment item "standard-bright" is adjusted by selecting the eighth level of ten levels from the brightest level, the point to internally divide the axis in the ratio of 8 to 2 is selected within the change range of the image quality parameter in the adjustment item "bright-standard." After that, the parameters obtained in the adjustment items "standard-sharp" and "standard-bright" are averaged to determine the set of image quality parameters. Note that the standard image quality parameter for each adjustment item is separately stored in, for example, the image quality parameter table 3-1 in FIG. 2.

The image processor 8 performs image processing on the image by using the determined image quality parameters to transmit the processed image to the image display 9. The image display 9 displays the image received from the image processor 8.

As stated above, it is possible for the viewer to easily display a suitable image by intuitively adjusting the adjustment items corresponding to each content category.

Note that although the content is categorized based on the sub-genre of EPG in the first embodiment, the present invention is not limited to this arrangement. For example, it is also possible to create a new genre category by referring to the keywords etc. which are previously extracted from the program information.

Further, when a desired genre category is not entered in the database 3, the viewer can create a new broad genre category corresponding to the upper genre category of the desired genre category.

It is also possible to calculate the initial values of the adjustment items by setting the present set value of each adjustment item as the image quality parameter, provided that an operation method is specifically determined.

It is also possible to determine each image quality parameter based on a nonlinear conversion instead of the conversion of the internally dividing point. Each image quality parameter can also be determined by weighting the adjustment items corresponding to the content, based on the priorities of the adjustment items.

In the first embodiment, the processes of the adjustment item determiner 4, the adjustment item display 5, and the set value reader 6 are performed regardless of whether or not the adjustment items corresponding to the category determined by the content categorizer 2 have already the present set values. However, when the adjustment items have already the present set values, these processes can be omitted to proceed to the process of the image quality parameter determiner 7. Further, when the present set values are not set for the adjustment items, it is also possible to display the message to inform the viewer that the present set value is not set yet.

Second Embodiment

An image display device according to a second embodiment of the present invention is provided as a device (such as a television, a PC, a cellular phone, and an image viewing device) capable of displaying the still image shot by a digital still camera or the video shot by a digital video camera, and is characterized in that the content is categorized by using the file information of these cameras.

In recent years, with a rapid spread of digital still cameras, the standards for the image data file to be recorded have been almost unified into Exif. Further, with the diversification of purposes, the kinds of attached information which can be recorded in the file have been increasing.

For example, a scene type can be entered in the Exif file. Further, it is possible to attach the information relating to the characteristics of image data by using tags such as "TransferFunction" representing the characteristics of a reproduction tone curve, "WhitePoint" representing the chromaticity coordinate value of a reference white point, "PrimaryChromaticities" representing the chromaticity coordinate value of a primary color, and "ReferenceBlackWhite" representing the values of a reference black point and a reference white point.

The block diagram of the image display device according to the second embodiment is similar to that in FIG. 1.

The second embodiment is characterized in that the content categories based on the shooting modes of the camera are entered in the database 3. Therefore, it is possible for the content categorizer 2 to categorize the content by using the file information. The other processes are similar to those in the first embodiment.

As stated above, it is possible for the viewer to easily display a suitable image of the digital camera by intuitively adjusting the adjustment items corresponding to each content category.

Third Embodiment

An image display device according to a third embodiment of the present invention can be suitably used when the information for the content categories (EPG information or Exif information) as described in the first embodiment and the second embodiment cannot be obtained, and is characterized in that the image is analyzed so that the content is categorized based on image analysis information representative of characteristic of image signals of the image.

The image analysis information includes the information calculated based on the image signal of the image, such as a histogram (for example, the histogram of luminance), a mean value (for example, the mean value of luminance), a standard deviation (for example, the standard deviation of luminance), and a color temperature. When using the mean value, for example, the content categories are determined by relating first to n-th mean value ranges to first to n-th content categories respectively to judge which range of the first to n-th mean value ranges includes the calculated mean value. This process is performed by the content categorizer 2. The first to n-th content categories each are related to the adjustment items in a similar manner as in FIG. 3 and FIG. 4. That is, the database is prepared so that the content categories such as "love dramas," "horror movies," and "soccer" in the database as shown in FIG. 3 and FIG. 4" are replaced by the first content category (the first mean value range)," "the second content category (the second mean value range)," and "the third content category (the third mean value range)," respectively. For example, when the mean value represents that an image is bright, the initial value of the adjustment item "bright-dark" should be set at a bright level because it is difficult to brighten the image more.

As stated above, according to the third embodiment, it is possible for the viewer to display a suitable image by analyzing the image to categorize the content even when the information to categorize the content is not provided.

Fourth Embodiment

An image display device according to a fourth embodiment of the present invention is provided to be incorporated into a television to receive broadcast signals or a cellular phone having a function to receive one-segment broadcasting, and is provided to sense and use audio-visual environmental information.

Figure 8:
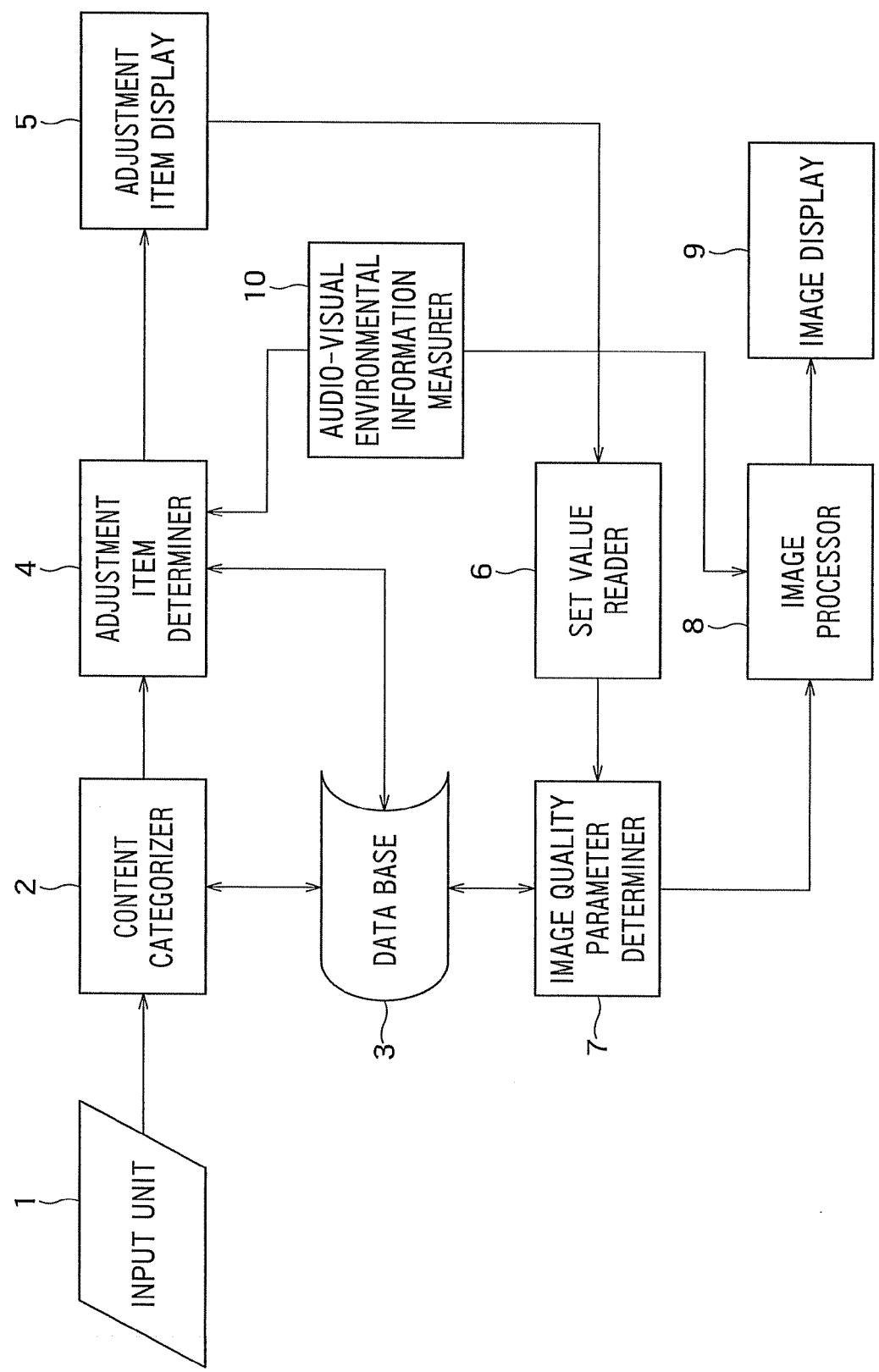
FIG. 8 is a block diagram showing an image display device according to a fourth embodiment of the present invention.

FIG. 8 is a block diagram showing an image display device according to the fourth embodiment. The image display device includes: the input unit 1; the content categorizer 2; the database 3; the adjustment item determiner 4; the adjustment item display 5; the set value reader 6; the image quality parameter determiner 7; the image processor 8; the image display 9; and an audio-visual environmental information measurer 10. The audio-visual environmental information measurer 10 is newly added to the image display device in the first embodiment. Note that the database 3 is similar to that in the first embodiment. Hereinafter, the difference from the first embodiment will be mainly explained, and overlapped explanations on the features similar to those in the first embodiment will be omitted.

An image is input into the input unit 1, and the content categorizer 2 determines the content category of the image.

The audio-visual environmental information measurer (lighting information measurer) 10 measures environmental information by using a sensor capable of measuring the lighting around the display device. The sensor can be selected from various sensors such as an illuminance sensor, a color temperature sensor, and an RGB sensor. The viewer senses the same illuminance differently from time to time. For example, the adaptability and sense of the viewer when watching the television with the light streaming through windows in the daytime is different from those when watching the television with the light of fluorescent lamps in the nighttime.

Based on the database 3, the adjustment item determiner 4 determines the adjustment items corresponding to the category determined by the content categorizer 2 by using the lighting information obtained by the lighting information measurer 10. As stated above, there are a conceivable sense and an inconceivable sense corresponding to the content category. Further, there are a conceivable sense and an inconceivable sense corresponding to environment. For example, it is known that the sense of color tones is inconceivable when the environment is dark. These characteristics are used to determine the priority (the adjustment items to be displayed) so that the viewer can easily adjust the adjustment items. Note that the priority table 3-4 in FIG. 5 used in the first embodiment can be used in the fourth embodiment.

The adjustment item display 5, the set value reader 6, and the image quality parameter determiner 7 are similar to those in the first embodiment.

The image processor 8 performs image processing by using the image quality parameters determined by the image quality parameter determiner 7 and the lighting information measured by the audio-visual environmental information measurer 10 and transmits the processed image to the image display 9. The image display displays the image received from the image processor 8.

As stated above, according to the fourth embodiment, it is possible for the viewer to display a suitable image by determining the adjustment items to be displayed by additionally using the environmental lighting information.

Note that it is possible to prepare an image quality parameter database as shown in FIG. 2 corresponding to each value or range of the lighting information so that the image quality parameter table corresponding to the measured lighting information can be used. In this case, it is not required for the image processor 8 to perform the image processing by using the lighting information. That is, the lighting information can be reflected in the image quality by the image quality parameter determiner 7 or the image processor 8.

In the present embodiment, the adjustment items to be displayed are determined by using the lighting information. However, it is also possible to categorize the content by using the lighting information. Further, it is possible to categorize the content based on the time zone or area in which the content is viewed.

Fifth Embodiment

An image display device according to a fifth embodiment of the present invention is not limited to a particular purpose.

The block diagram showing the image display device according to the fifth embodiment is similar to FIG. 1. Hereinafter, the difference from the first embodiment will be explained.

The input unit 1 and the content categorizer 2 are similar to those in the first embodiment.

The database 3 in the fifth embodiment has a recommended range table 3-5, in which recommended adjustment ranges corresponding to each content category are entered, in addition to the database 3 (3-1, 3-2, 3-3, 3-4) in the first embodiment. FIG. 9 shows an example of the recommended range table.

As in the first embodiment, the adjustment item determiner 4 refers to the database 3 to determine the adjustment items corresponding to the category determined by the content categorizer 2. In the fifth embodiment, the adjustment item determiner 4 additionally refers to the recommended range table 3-5 in FIG. 7 to determine the ranges whose adjustment is recommended to the viewer.

Figure 10:
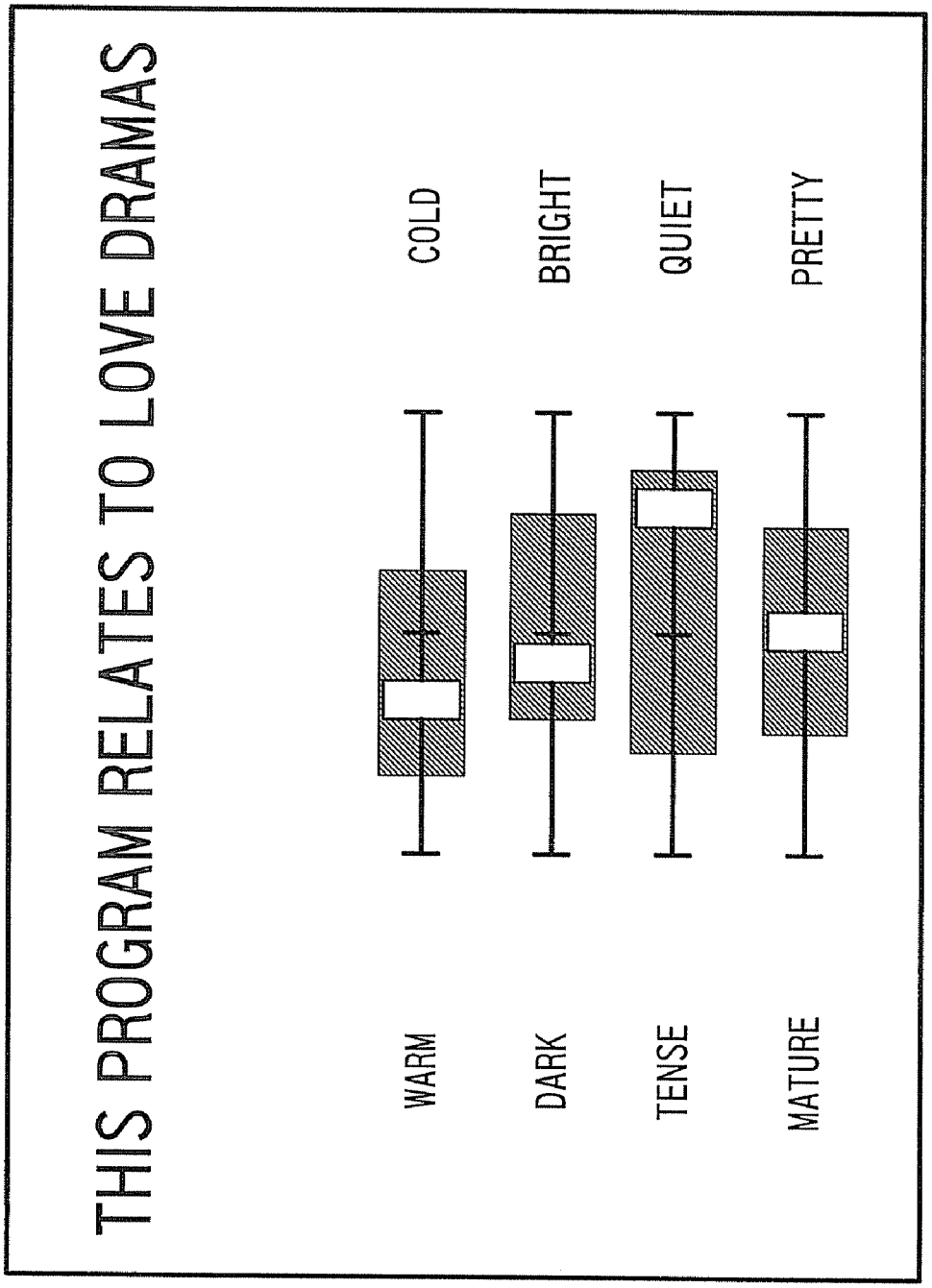
FIG. 10 is a diagram showing a display example of the recommended ranges according to the fifth embodiment of the present invention.

The adjustment item display 5 displays the adjustment items and a recommended adjustment ranges determined by the adjustment item determiner 4. FIG. 10 shows a display example of the recommended adjustment ranges. The hatched portions correspond to the recommended adjustment ranges. Since the recommended adjustment ranges are set, the viewer can easily set the adjustment items.

The set value reader 6, the image quality parameter determiner 7, the image processor 8, and the image display 9 are similar to those in the first embodiment.

In the present embodiment, the recommended adjustment ranges are previously registered in the database. However, it is also possible to calculate the recommended adjustment ranges by analyzing the image. Concretely, it is possible to calculate the recommended ranges in accordance with a rough pixel value distribution obtained by analyzing the image. For example, the recommended range for a bright image which cannot be further brightened should be set at a darker level than the middle level.

As stated above, it is possible for the viewer to easily display a suitable image by adjusting the adjustment items whose recommended adjustment ranges are displayed corresponding to each content category.

What is claimed is:

1. An image display device comprising:
   an image input unit configured to input an image;
   a content categorizer configured to determine a content category of the image to one of a plurality of content categories given in advance;
   a database configured to store adjustment items corresponding to each of the content categories, the adjustment items being related to sensibility words each representing an impression for images;
   an adjustment item display configured to display the adjustment items corresponding to the content category, the adjustment item being selectable by a user;
   a receiver configured to receive set values of the adjustment items selected from the user;
   an image quality parameter calculator configured to calculate image quality parameters in accordance with the set values of the adjustment items;
   an image processor configured to perform image processing on the input image in accordance with the image quality parameters; and
   an image display configured to display the processed image.

2. The device according to claim 1,
   wherein the database further stores the set values of the adjustment items correspondingly to each of the content categories,
   the adjustment item display further displays the set values of the adjustment items corresponding to the determined content category,
   the receiver changes the displayed set values with the set values, and
   the image quality parameter calculator uses the changed set values.

3. The device according to claim 1, wherein
   the content categorizer acquires at least one of program content information transmitted through teletext broadcasting, program information transmitted through data broadcasting, and EPG (Electronic Program Guide) information transmitted through digital broadcasting or the Internet and detects, based on the acquired information, an image genre serving as the content category of the input image.

4. The device according to claim 1, wherein the content categorizer acquires image file information of the input image and determines the content category of the image based on the image file information.

5. The device according to claim 1, wherein the content categorizer determines the content category of the image based on a time zone or an area in which the image is viewed.

6. The device according to claim 1, further comprising a lighting information measurer configured to obtain lighting information by measuring environmental lighting by using a sensor,
   wherein the content categorizer determines the content category based on the lighting information.

7. The device according to claim 1, wherein the content categorizer analyzes the image to obtain image analysis information representative of characteristic of image signals of the image, and determines the content category of the image based on the obtained image analysis information.

8. The device according to claim 7, wherein the image analysis information includes at least any one of an image signal histogram, a mean value, a standard deviation, and a color temperature.

9. The device according to claim 1,
   wherein priorities is set to the adjustment items for each of the content categories, and
   wherein the display displays the adjustment items corresponding to the determined content category on a priority basis.

10. The device according to claim 1 further comprising a lighting information measurer configured to obtain lighting information by measuring environmental lighting by using a sensor,
    wherein the display selects at least one adjustment item from the adjustment items corresponding to the content category based on the lighting information and displays the selected adjustment item.

11. The device according to claim 1, wherein the adjustment item display further displays recommended setting ranges of the set values to be received from the user.

* * * * *